United States Patent [19]

Gale et al.

[11] 4,036,726

[45] July 19, 1977

[54] METHOD AND APPARATUS FOR ELECTROCHEMICAL CONTAMINANT REMOVAL FROM LIQUID MEDIA

[75] Inventors: Stephen B. Gale, Williamsville; Phillip P. O'Donnell, Buffalo; Stanley Bruckenstein, Williamsville, all of N.Y.

[73] Assignee: Andco Incorporated, Buffalo, N.Y.

[21] Appl. No.: 654,563

[22] Filed: Feb. 2, 1976

Related U.S. Application Data

[62] Division of Ser. No. 547,940, Feb. 7, 1975.

[51] Int. Cl.² .......... C02B 1/82; C02C 5/12; C25C 7/00; C25C 7/02
[52] U.S. Cl. .................. 204/231; 204/149; 204/152; 204/268; 204/269
[58] Field of Search .............. 204/231, 149, 152, 268, 204/269

[56] References Cited

U.S. PATENT DOCUMENTS

| 398,101 | 2/1889 | Webster, Jr. | 204/149 X |
| 589,252 | 8/1897 | Elmore | 204/268 |
| 806,413 | 12/1905 | Kother | 204/268 |
| 943,188 | 12/1909 | Hartman | 204/268 X |

Primary Examiner—Arthur C. Prescott
Attorney, Agent, or Firm—Christel & Bean

[57] ABSTRACT

Contaminating ions are removed from an aqueous medium, e.g. hexavalent chromium ions from cooling tower waters, by an electrochemical method which includes formation of an insoluble iron compound or complex of the contaminant ion, utilizing an anode of iron, iron alloy or insoluble iron compound. The electrodes are treated with an acid solution at regular intervals to remove any substances formed on or lodged between the electrodes. The electrolytic cell includes a plurality of closely spaced generally parallel plate electrodes with electric potential applied to the two end electrodes, and an electrode near each end electrode is of a size protecting the end electrode from flux field effects.

13 Claims, 8 Drawing Figures

METHOD AND APPARATUS FOR ELECTROCHEMICAL CONTAMINANT REMOVAL FROM LIQUID MEDIA

This is a division, of application Ser. No. 547,940 filed Feb. 7, 1975.

BACKGROUND OF THE INVENTION

This invention relates to the art of electrochemical treatment of liquids to remove contaminants therefrom.

One area of use of the present invention is the electrochemical treatment by means of consumable electrodes of ionizing liquid media to remove contaminant ions, although the principles of the present invention can be variously applied. Insoluble reaction products of such treatment may tend to accumulate in a manner blocking the flow passages between closely spaced electrodes and other reaction products may form coatings on the electrode surfaces in a manner interfering with proper operation of the treatment apparatus. Where the apparatus for carrying out such treatment comprises a stacked arrangement of a plurality of closely spaced consumable electrodes with electrical connection being made to the two outer or end electrodes, such electrodes may encounter rapid wear and early failure in the electrode region adjacent the gas-liquid interface. In addition, uneven dissolution of electrodes in apparatus of this type can give rise to problems in cell operation and maintenance.

SUMMARY OF THE INVENTION

It is, therefore, an object of this invention to provide a new and improved method and apparatus for electrochemically removing by means of consumable electrodes contaminant ions from ionizing media.

It is a more particular object of this invention to provide such a method which includes effective removal of substances lodged between or formed on the electrode surfaces.

It is more particular object of this invention to provide such apparatus wherein the outer or end electrodes to which electrical potential is applied in an arrangement of closely spaced electrodes are protected from flux field effects.

It is a further object of this invention to provide such apparatus having relatively even dissolution or wear of electrode surfaces.

It is a further object of this invention to provide such method and apparatus which is effective and economical to operate.

The present invention provides an electrochemical method and apparatus for removing contaminant ions from an ionizing medium including formation of an insoluble compound or complex of the contaminant ion utilizing consumable electrodes, such as an anode of iron, iron alloy or insoluble iron compound. The electrodes are treated at appropriate intervals with an acid solution to remove any substances on or lodged between the electrode surfaces. A plurality of closely spaced generally parallel plate electrodes includes end electrodes to which electrical potential is applied, and an electrode near at least one end electrode is positioned to protect the end electrode from flux field effects.

The foregoing and additional advantages and characterizing features of the present invention will become clearly apparent upon a reading of the ensuing detailed description wherein:

DETAILED DESCRIPTION OF THE ILLUSTRATED EMBODIMENTS

Figure 1:
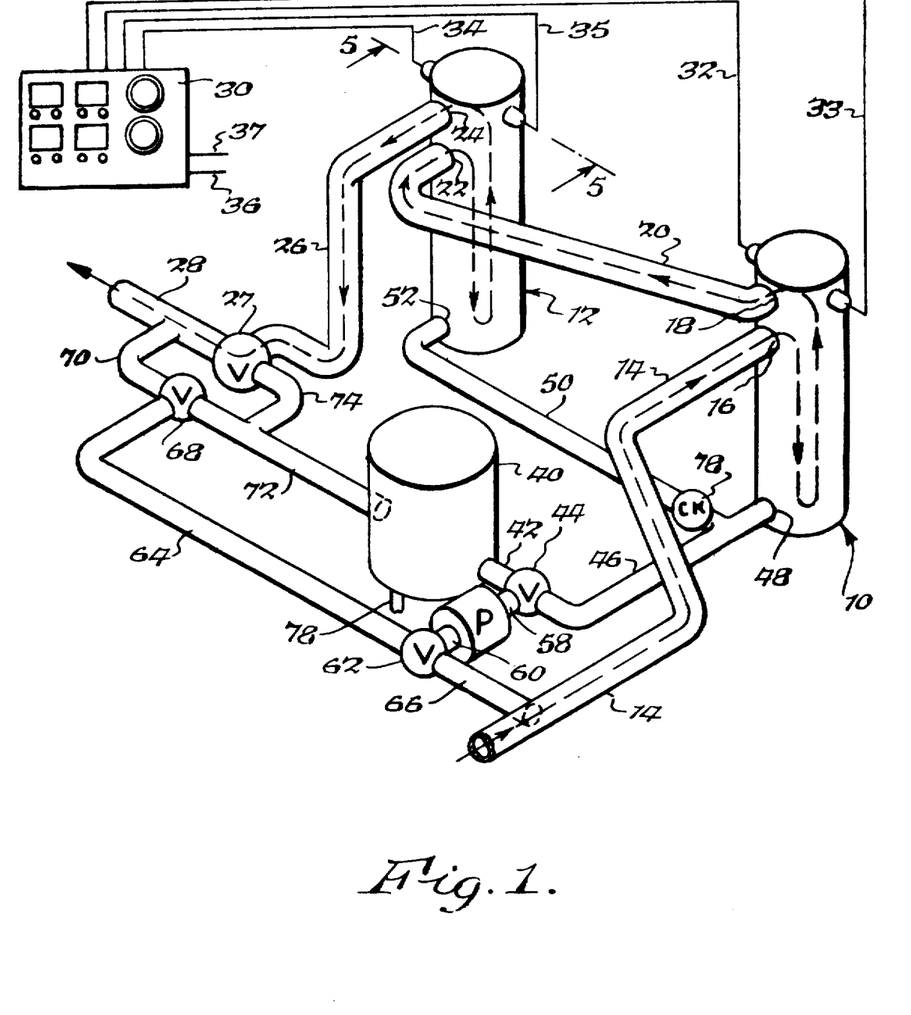
FIG. 1 is a schematic diagram of apparatus for removing contaminant from liquids by the method of this invention and illustrating one phase in the operation thereof.

A system for electrochemically removing contaminants from ionizing media according to the present invention is shown in FIG. 1. A detailed description of an electrochemical method and apparatus to which the present invention is applicable is found in U.S. patent application Ser. No. 332,884 filed Feb. 16, 1973 entitled "Electrochemical Contaminant Removal From Aqueous Media" assigned to the assignee of the present invention, and the disclosure of which is hereby incorporated by reference. Briefly, the method is for electrochemically removing from an ionizing medium a contaminant ion which is capable of forming an insoluble iron compound or complex, and the method includes passing an electric current between an anode electrode which has a surface or a portion of a surface thereof or iron, iron alloy or insoluble iron compound, and cathode electrode, through the ionizing medium containing the ion to be removed, so as to produce anodically an insoluble iron compound, species or complex while cathodically reacting with the contaminant ion to form insoluble products, and removing such insoluble material from the ionizing medium. In preferred embodiments of the invention the contaminant, which is initially toxic, is converted to non-toxic or less toxic form which is insoluble and is removed. For example, hexavalent chromium in chromate or dichromate salt form is changed to the less toxic trivalent form which is capable of forming insoluble complexes and is removed as a complex of iron.

Referring now to FIG. 1, the apparatus includes a pair of electrolytic cells 10, 12 which are identical in construction and operation, although for some applications it may be desirable to have the cells of different relative size or capacity. Each of the cells 10, 12 includes anodes of iron such as hot and cold rolled steel or stainless steel, iron alloy or insoluble iron compounds such as ferrous oxide or magnetic, and cathodes which preferably are also of iron but may be of other suitable electrode materials compatible with the anode and electrolyte. Electrical potential is applied to the anodes and cathodes in a manner which will be described.

Liquid to be treated, for example a waste liquid effluent such as cooling tower blowdown water, is transmitted to the system by a conduit 14 connected to the inlet 16 of cell 10. Outlet 18 of cell 10 is connected by a conduit 20 to the inlet 22 of cell 12. The outlet 24 of cell 12 is connected through conduit 26, valve 27 and conduit 28 to a suitable solids handling arrangement. The latter can comprise, for example, a convential clarifier, filter, inclined tube or plate clarifier, or lagoon for separating clarified effluent from the sludge, and the sludge can be subjected to incineration, drying in sludge beds, centrifuging or vacuum filtration. A d.c. power supply 30 is connected by lines 32, 33 to cell 10 and by lines 34, 35 to cell 12, the input power to supply 30 being delivered by lines 36, 37.

In operation, as indicated by the broken lines in FIG. 1, liquid from conduit 14 enters cell 10 in the upper portion through inlet 16 and flows downwardly through an annular passage to the bottom region of the cell where the flow then is directed upwardly through an arrangement of stacked, closely spaced and vertically disposed electrode plates and then the liquid leaves the top of the cell 10 through outlet 18. The liquid flows through conduit 20 into inlet 22 of cell 12 in the upper portion and flows first downwardly and then upwardly through an arrangement of vertically stacked, closely spaced electrode plates in a manner similar to that of the flow through cell 10. The liquid leaves cell 12 through outlet 24 thereof. The electric current passed through each cell, in particular between the anodes and cathodes thereof and through the ionizing medium containing the ion to be removed, produces an insoluble iron compound or complex with the contaminant ion. In particular, hydrogen gas and hydroxide ion are produced at the cathode on the passage of current, simultaneously at the anode iron is oxidized to ferrous ion, and the ferrous ion produced at the anode and the hydroxide ion produced at the cathode diffuse into solution and react forming ferrous hydroxide. The ferrous hydroxide reduces the contaminant ion so as to produce an insoluble iron compound or complex with the contaminant ion. The hydrogen gas is vented to the atmosphere through a suitable relief valve (not shown) at the top of the cell.

The contaminant to be insolubilized by the foregoing reaction may be in various liquid media in which ionic reactions may occur, the contaminant generally will be substantially completely or entirely dissolved in the medium, and non-interfering solvents, solutes and suspended materials may also be present. The anodes will have the active surfaces thereof at least partially of a material which releases iron in the ionizing medium by action of the electric current, usually at least 50% and preferably over 90% and in most preferred cases the entire electrode being of such material. Mixtures of iron, iron alloys and insoluble iron compounds may be employed. The cathodes are preferably also of iron, although because the cathode is relatively inert with respect to removal of contaminant ions from the ionizing medium being treated the nature of the cathode material is not critical but should be compatible with the anode and electrolyte and not interfere with the insolubilization of the soluble contaminant to be removed. Generally, the proportion of contaminant in the ionizing medium will be less than 1% although as much as 15% may sometimes be present. Normally, the initial contaminant concentration will be no less than 0.03 parts per million, in most instances from 1 to 5,000 p.p.m. and usually from 2 to 500 p.p.m. The current density in amperes per square foot (ASF) is in the range from 0.05 to 500. The pH is maintained within the range of about 4 to 11, more preferably from 6 to 10. The dwell time in the apparatus, determined by the flow of electricity, can be as little as 0.001 minute so as long as one hour but normally at least 5 seconds or 0.1 minutes is required. For a more detailed description of the foregoing reaction, reference should be made to the aforementioned application Ser. No. 332,884.

In the use of cold and not rolled steel anodes for the electrochemical generation of ferrous species according to the foregoing reaction, a problem encountered in commercial scale systems is the formation of adherent hydrous oxide gelatinous precipitates which can lead to blocking of flow channels in the apparatus, especially the passages between the closely spaced stacked electrode plates. Another problem encountered is the formation of an insoluble insulating iron oxide layer on the electrode surface, often underneath the gelatinous precipitates, which can give rise to high over-voltages and the generation of oxygen at the anode.

In accordance with the present invention there is provided the further step of treating the electrodes with a solution containing acid to remove any substances on or lodged between the surfaces of the electrodes, the step being done at regular intervals. As shown in FIG. 1, the system of the present invention includes means in the form of a tank 40 for storing the acid solution. Tank 40 is connected through a conduit 42, valve 44, and conduit 46 to a second outlet 48 of cell 10. Outlet 48 is located near the bottom of cell 10. A conduit 50 connected at one end to a bottom outlet 52 of cell 12 and at the other end to conduit 46 places tank 40 also in communication with cell 12. The apparatus further includes a pump 56, one side of which is connected through a conduit 58 and through valve 44 to conduits 42 and 46. The other side of pump 56 is connected by a conduit 60 and through a valve 62 to conduits 64 and 66. Conduit 66 leads into conduit 14, and conduit 64 leads to a valve 68. Valve 68, in turn, is connected between a pair of conduits 70 and 72. Conduit 70 leads into the system outlet conduit 28, and conduit 72 is connected to tank 40. A conduit 74 is connected at one end to conduit 72 and at the other end to valve 27 joining conduits 26 and 28.

Figure 2:
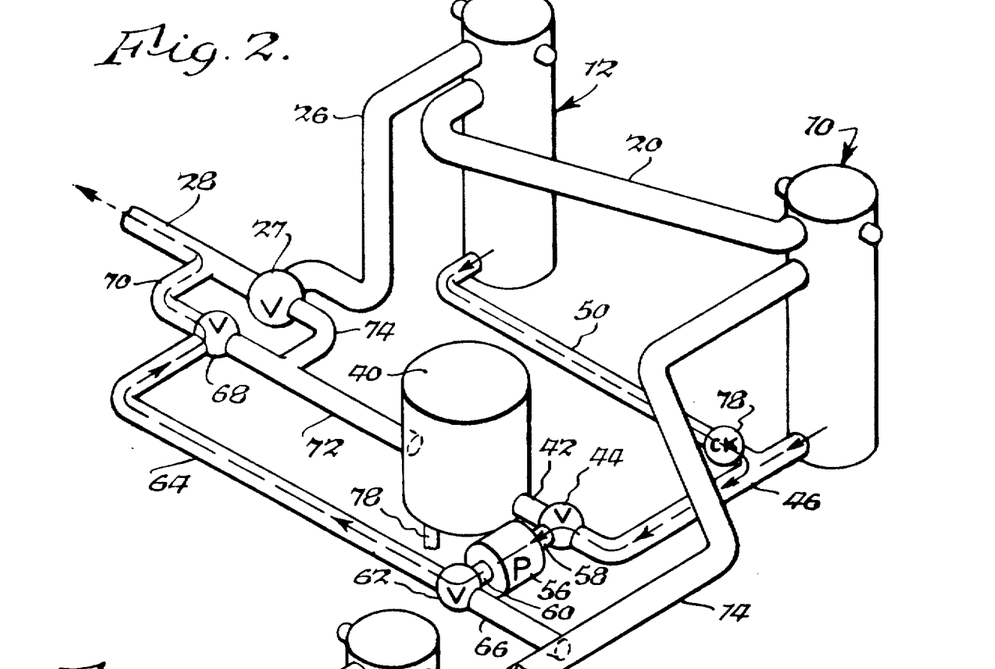
FIG. 2 is a schematic diagram similar to FIG. 1 and illustrating another operating phase.
Figure 3:
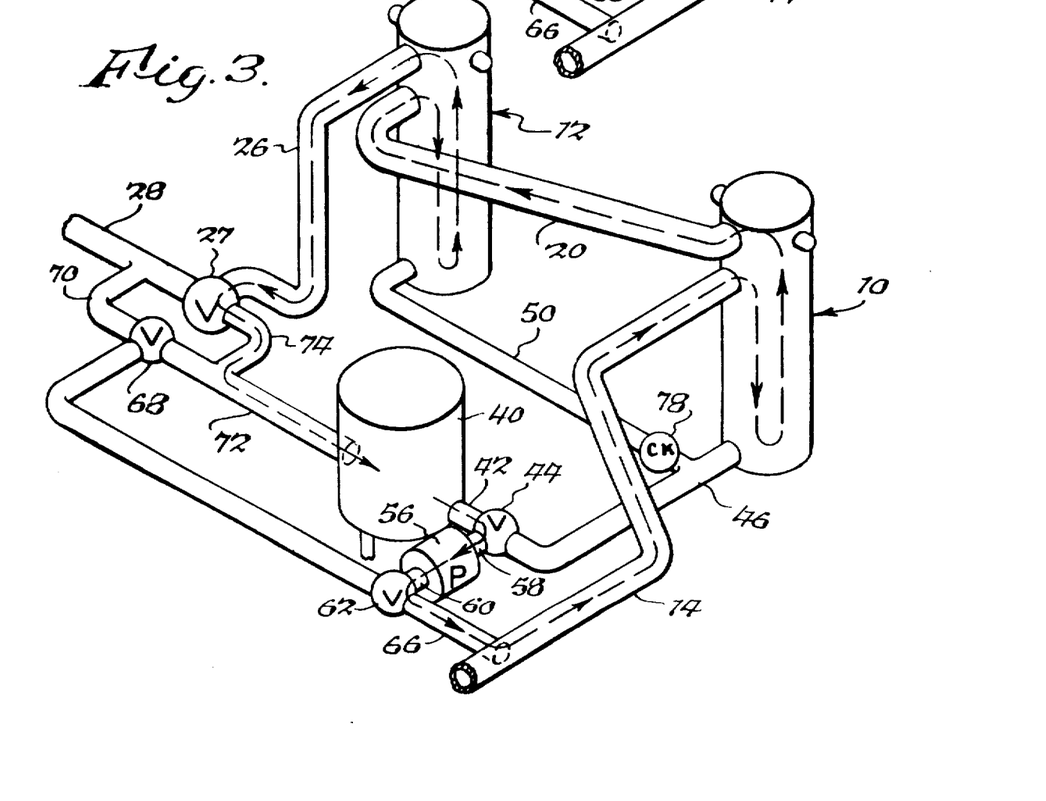
FIG. 3 is a schematic diagram similar to FIG. 1 and illustrating another operating phase.

A typical and preferred mode of operation would include continuous operation of the cells treating incoming liquid from conduit 14 for a period of about one day. During such operation pump 56 is not operating and valves 44, 62 and 68 are set in a manner controlling the flow as indicated in FIG. 1, with valve 27 allowing flow from conduit 26 to conduit 28. A check valve 78 in conduit 50 prevents any bypass flow away from the plates of cell 10 through conduit 50. At the end of the day, the acid solution contained in tank 40 is flowed or circulated through cells 10 and 12 in the following manner. First the flow of incoming liquid in conduit 14 is stopped, such as by a valve (not shown) in conduit 14 upstream of conduit 66, and the liquid remaining in cells 10, 12 is removed. This is accomplished by operating pump 56 and by placing valve 27 in a position blocking flow between conduits 26 and 28 and to conduit 74, valve 44 in a position connecting only conduits 46 and 58, valve 62 in a position connecting only conduits 60 and 64, and valve 68 in a position connecting only conduits 64 and 70 as shown in FIG. 2. The liquid in cells 10, 12 thus flows outwardly therefrom into conduits 50 and 46, being drawn through pump 56 and transmitted along conduit 64 and through valve 68 and conduit 70 into outlet conduit 28 as indicated by the broken lines in FIG. 2. When all or substantially all of the liquid is removed from cells 10, 12 the acid solution stored in tank 40 is conveyed serially through cell 10 and cell 12 and returned to tank 40 in the following manner. Pump 56 is operated and valve 44 is placed in a position connecting only conduits 42 and 58, valve 62 in a position connecting only conduits 60 and 66, valve 27 in a position connecting only conduits 26 and 74 and valve 68 blocking all flow as shown in FIG. 3. The acid solution is drawn from tank 40 by pump 56 and is flowed serially through cells 10, 12 and returned to tank 40 as indicated by the broken lines in FIG. 3.

Figure 4:
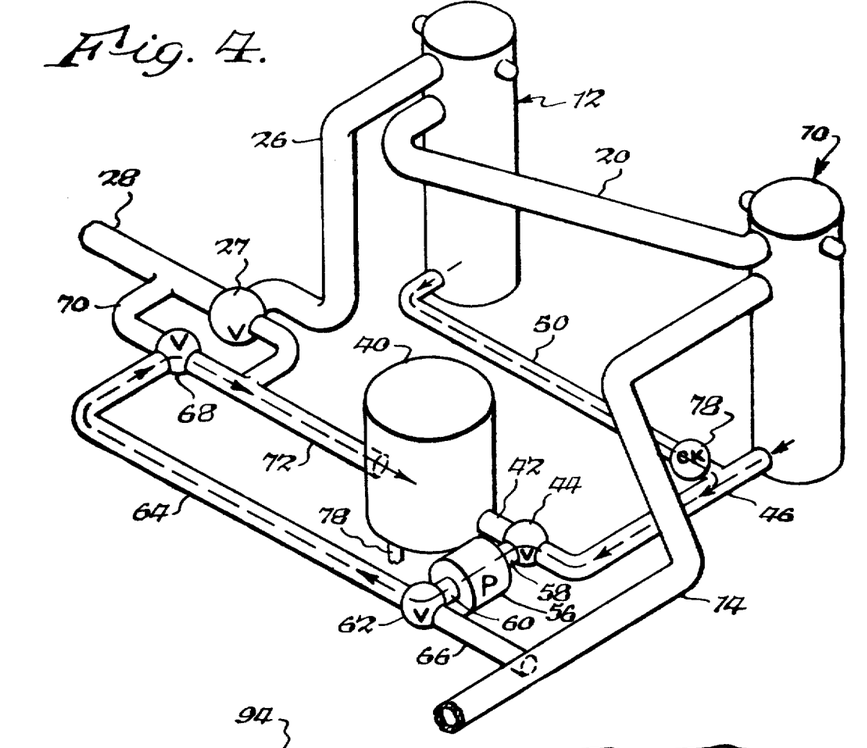
FIG. 4 is a schematic diagram similar to FIG. 1 and illustrating another operating phase.

According to a preferred mode of the present invention the acid solution from tank 40 is recirculated through the cells 10, 12 for a time from about 5 minutes to about 10 minutes. A flow rate of about 25 gallons per minute was found to provide satisfactory results. The flow rate must be sufficient to dissolve the gelatinous precipitates and the oxide layers and to remove the material or sludge from the cell, i.e. sufficient to provide the required mechanical washing action. An aqueous solution at about 3 percent to about 5 percent concentration of technical grade hydrochloric acid was found to provide effective removal of the ferric oxide layer and gelatinous precipitates while at the same time not dissolving or otherwise damaging the electrode plates. Other acids which satisfy this requirement can of course be used. It is preferred to circulate the acid solution through cells 10, 12 with no electrical power being supplied to the cells, although it has been found that the washing operation can be performed in a relatively shorter period of time if the electric power is applied. While good results have been obtained with the foregoing washing procedure done once per day, there may be situations where a greater level of electriccurrent is used during the treating operation thereby requiring that the acid washing procedure of the present invention be performed at a rate more frequently than once per day. At the end of the washing cycle, the acid solution is removed from cells 10, 12 and returned to tank 40. This is done by operating pump 56 and by placing valve 44 in a position connecting only conduits 46 and 58, valve 62 in a position connecting only conduits 60 and 64, valve 68 in a position connecting only conduits 64 and 72 and valve 27 in a position blocking all flow as shown in FIG. 4. The acid solution in cells 10, 12 thus flows from cells 10, 12 through conduits 50 and 16, through conduits 64 and 72 into tank 40 as indicated by the broken lines in FIG. 4. Then the apparatus is ready for another operating cycle for treatment of liquid obtained from input conduit 14.

The solution stored in tank 40 can be periodically replenished with additional acid and at an appropriate time later on, the solution in tank 40 is removed and replaced with a new solution. The solution removed will have an acid strength of less than 10% and it can be simply bled into an effluent stream or it could be stored in ponds or tanks and periodically neutralized. In any event the nature of the solution in tank 40 is such that it does not pose any disposal problem. According to a preferred mode of the present invention once per month and prior to the last day of treatment, the contents of tank 40 is bled into the treated effluent and discharged into the solids handling arrangement for solids removal and final disposal. This is done by setting the valves appropriately and operating pump 56 to draw solution from tank 40 through pump 56, conduit 64, valve 68, conduit 70 and into outlet conduit 28. Tank 40 also is provided with a conventional valved drain outlet 78.

By virtue of the method of the present invention, the cells 10 and 12 can be operated at the original electrical current and voltage quantities. Heretofore, coatings formed on the electrode surfaces would require higher operating voltage to obtain the same level of current. With the ferric oxide coating being removed from the electrode plates by the method of the present invention, there is no problem of having to operate at a higher voltage to obtain the same level of current. Thus the method of the present invention prevents the occurrence of large increases of voltage from occurring across cells of this type which, without the foregoing procedure, can occur after about fourty hours of operation and cause cessation of high efficiency generation of ferrous species at the anode. Treating the electrodes wih acid solution according to the present invention also removes any foreign matter which might flow into the cell with the effluent and accumulate. Thus, the acid wash recirculation technique allows each electrochemical cell in a system of this type to be operated at about 98% of the time based upon a 24 hour day and yield at least 75% utilization of the iron electrodes in the cell. While the method of the present invention has been illustrated by a system including the two electrolytic cells 10 and 12, the method is of course applicable to an arrangement having only one cell or a plurality of any number of cells.

FIGS. 5-8 illustrate in further detail an electrolytic cell according to the present invention, for example cell 12 shown in FIG. 1. The cell includes a housing of electrically insulating and inert material, for example a suitable plastic material such as polyvinyl chloride which can be reinforced with fiberglass. The housing comprises four main parts including a generally cup-shaped base or bottom portion 90, a generally cylindrical central portion or section 92 which fits at one end thereof into the base 90, a generally cup-shaped upper portion 94 which sets on the upper end of central section 92, and a cap or closure 96 secured to the top portion. The central section 92 is provided with an opening to receive a pipe fitting 98 defining inlet 22, and section 92 and base 90 are provided with aligned openings for receiving a pipe fitting 100 defining outlet 52 adjacent the lower portion of the cell. Similarly, the upper portion 94 is provided with an opening for receiving a pipe fitting 102 defining outlet 24. When assembly of the cell is completed, it is closed by cap element 96 which is connected to an annular flange 104 of top portion 94, connection being made by a plurality of suitable fasteners 106 with a sealing gasket 108 positioned therebetween. Upper portion 94 has a generally planar bottom surface portion 110 provided with a generally square shaped central opening defined by depending opposed wall portions 112-115. In an assembled cell positioned for use, the bottom 110 of housing portion 94 is generally horizontal, being secured such as by bonding to the upper edge of section 92.

The cell of the present invention further comprises a frame or holder 118 for positioning a plurality of planar electrodes in closely spaced and substantially parallel relation in the cell body. The frame or holder 118 is hollow rectangular in shape, in the present illustration square in cross-section, and includes wall portions 119-122. The walls are of inert and electrically insulating material, for example a suitable plastic such as polyvinyl chloride which can be reinforced with fiberglass.

Walls 119-122 are preferably suitably bonded together at the edges to provide the hollow rectangular frame or housing, but frame 118 could be of an integral molded construction. One pair of opposed walls is provided with longitudinal and closely spaced parallel grooves facing inwardly of frame 118, the opposed grooves being in alignment. The holder 118 containing the electrodes fitted therein is received adjacent the upper end of the cell as viewed in FIGS. 5 and 6 relatively snugly within the opening in the base of upper portion 94 defined by the wall portions 112-115 as to be supported and firmly held thereby. The holder and electrode plates are supported adjacent the bottom of the cell by the following preferred arrangement. A pair of spaced-apart, generally parallel supporting elements 126, 128 are secured on the bottom of the cell, being disposed generally perpendicular to the planes of the electrode elements. Thus the electrodes and the holder rest upon the upper surfaces of the elements so that an open space for liquid flow is provided between the bottom edges of the electrode plates and the bottom of the cell. The supporting elements are held in place by a pair of right angle bracket members 130, 132 fastened thereto and secured in a suitable manner to the bottom of the base portion 90.

Figure 5:
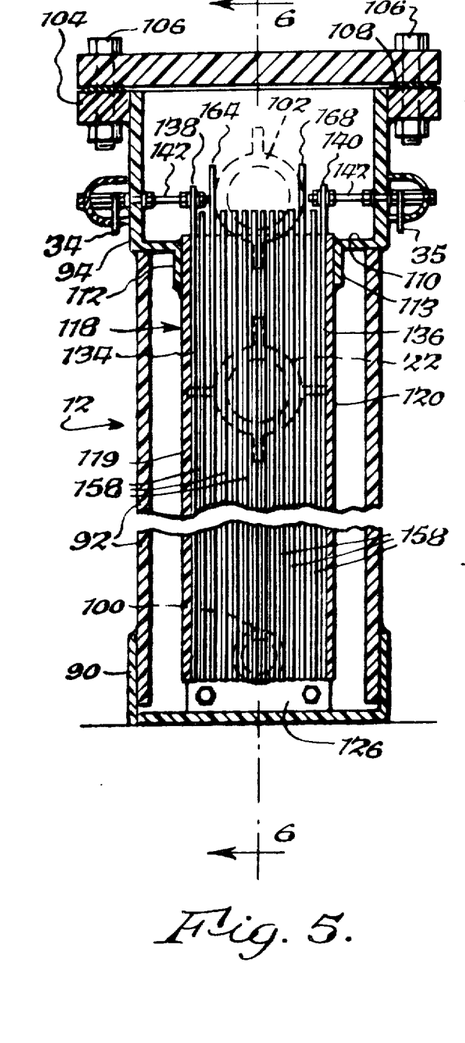
FIG. 5 is a vertical sectional view taken about on line 5—5 in FIG. 1 showing an electrolytic cell according to the present invention.
Figure 6:
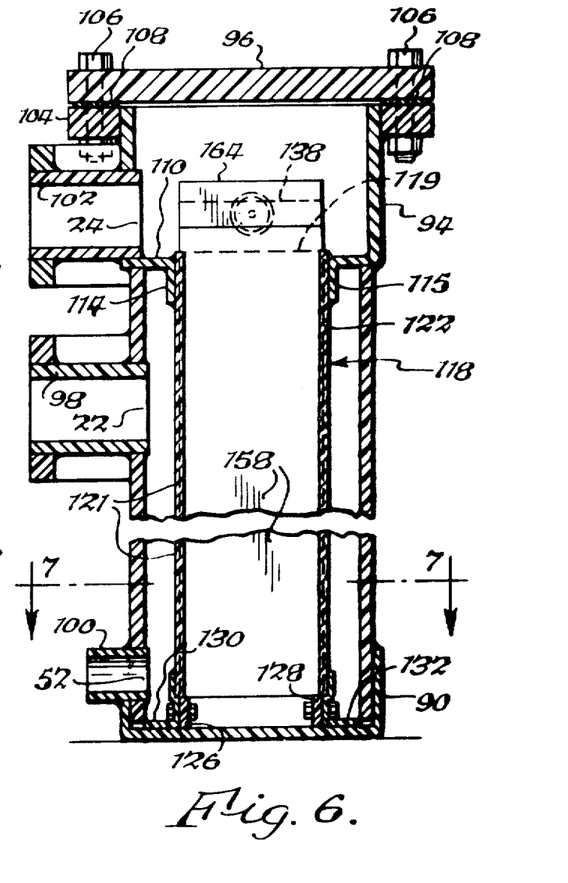
FIG. 6 is a vertical section view taken about on line 6—6 in FIG. 5.
Figure 7:
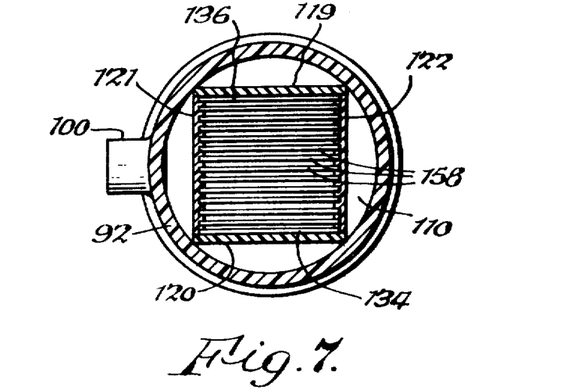
FIG. 7 is a cross-sectional view taken about on line 7—7 in FIG. 6.
Figure 8:
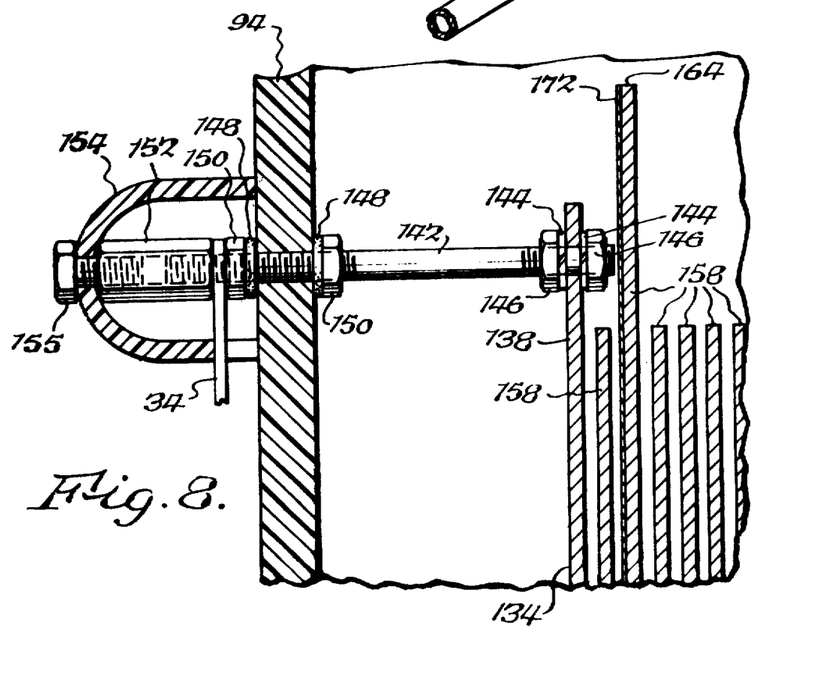
FIG. 8 is an enlarged fragmentary sectional view of a portion of the cell of the present invention.

As previously described, a plurality of electrode plates are postioned within holder 118, being firmly held therein in closely spaced, generally parallel relationship. As shown in FIG. 5, the plates extend along the entire longitudinal dimension of the holder, being slightly greater in overall length. The plates are all of the same overall length with the exception of four of the plates for a purpose to be described. In the present illustration a total of fourteen plates is shown, although a smaller or larger number thereof can be employed depending upon the operating conditions. The end or outer electrode elements 134 and 136 of the arrangement each are of slightly greater length, thereby including extending portions 138 and 140, respectively, for the purpose of making electrical connection thereto. In particular, and referring in detail to FIG. 8, an electrically conductive threaded rod or bolt 142 extends through an opening provided in the housing upper portion 94 and also into an opening provided in the extending portion 138 of end electrode 134. The end of bolt 142 is secured thereto by an arrangement of conductive lock washers 144 and 146 threaded thereon. The other end of the bolt is fastened to the housing wall 94 by an arrangement of rubber grommets 148 an nuts 150 threaded thereon. The electrical line 34 is connected to the outer end of bolt 142 and held thereto by a sleeve 152 threaded on the bolt and against the nut 150 located external to housing wall 94. The connection is protected by an insulating cover piece 154 of generally semispherical shape with the edge thereof abutting the outer surface of housing portion 94. A fastener 155 of insulating material extends through an aperture in cover 154 and threads into the other end of sleeve 152 to hold cover 154 in place. An identical arrangement is provided for connecting electrical lead 35 through a bolt to the extending portion 140 of the outer electrode 136 at the opposite end of the stack or series. Each cell in the system would have similar arrangements.

In the electrolytic cell of the present invention, electric potential is applied directly from power supply 30 to only the outer or end electrodes 134 and 136. Depending upon the relative polarity of the applied potentials, one of the end electrodes serves as an anode and the other as a cathode. Electric potential then is applied to the intermediate or additional electrodes 158 by induction. In particular, and referring to the electrode arrangement of FIG. 5, assuming that line 34 is at a relatively positive potential, and line 35 at a relatively negative potential, lines of flux emanating from the end electrode 134 will induce relatively negative charges on the surface of the very next electrode 158 facing the end electrode 134 and this, in turn, causes relatively positive charges to appear on the opposite surface of that electrode 158. The inductive effect proceeds through theremainder of the electrodes 158 in the arrangement such that there are negative charges present on the left hand surface of each electrode 158 in the arrangement as viewed in FIG. 5 and relative positive charges on the right hand surfaces thereof. The direct application of negative potential to end electrode 136 induces relatively positive charges on the right hand surfaces of the electrodes 158 and negative charges on the left hand surfaces in a similar manner. The foregoing inductive action is enhanced by the degree of close spacing of the electrode plates and by the degree of conductivity of the liquid in the cell which serves as an electrolyte.

During the foregoing mode of operation, where electrical potential applied to the end electrodes 134, 136 induces charge in the electrodes 158 therebetween, the lines of flux travel not only through the region between the plates but also outwardly from the edges of the plates, particularly from the upper edges as viewed in FIG. 5 in the region above the electrodes and below the cell cover 96. These fringe lines of flux emanating from the plate edges travel in generally curved paths between relatively positive and negative potential points. A problem observed to occur in commercial scale apparatus involved selected dissolution of the end plate electrodes 134, 136 at the gas-liquid interface. Such dissolution can proceed from the top of the electrodes to the point of the electrical lead-in connection whereupon the cell becomes disabled. This is believed to occur as a result of complete or continuous flux loops from the electrodes encountering the end electrodes which induce current therein, the current density being the highest at the region of the gas-liquid interface. This causes the end electrodes to erode at a rate greater than that of the other electrode plates. In accordance with the present invention, an electrode plate 158 near or adjacent the corresponding one of the end electrodes 134, 136 to which electric potential is applied extends beyond the end or outer electrode by an amount sufficient to protect the electrodes from flux field effects causing excessive current density. The electrode 158 extends upwardly as viewed in FIG. 5 into the region above the electrodes and below the cell cover 96. This serves to break the flux lines in that region in a manner preventing them travelling to an end electrode thereby protecting those electrodes. Thus, flux lines emanating from electrodes into this upper region and tending toward an end electrode would first encounter the extended electrode and be blocked or cut, in any event not reaching the end electrode. In the present instance the second neighboring or adjacent electrode 158 relative to end electrode 134 is made of greater length including the extending portion 164. Similarly, the second neighboring or adjacent electrode 158 from end electrode 136 is made of greater length including the extending portion 168. For example, a flux line leaving end electrode 138 in the space above the plates would be broken or cut by portion 164 and thus be unable to encounter end electrode 140. Similarly, flux leaving end electrode 140 in the space above the plates would be broken or cut by portion 168 and thus not travel to end electrode 138. In an illustrative cell, the intemediate electrodes 158 are 48 inches in length, the end electrodes are 49 inches in length, and the two electrodes 158 having the extending portions 164 and 168, respectively, are 50 inches in length. All plates can be about one-eighth inch thick and spaced apart about one-eighth inch. In the arrangement of the present illustration, the second neighboring electrode is extended rather than the first or immediately adjacent electrode, in order to provide sufficient space for connecting bolts 150 to the end plates 134, 136.

The shiedling or protecting function provided by the extending portions 164, 168 of the two electrodes 158 is enhanced by coating the extending portions on the surface facing the corresponding end electrode with an electrically insulating material. In the present illustration the surface facing the corresponding end electrode is coated as indicated by coating 172 shown in FIG. 8 although both surfaces could be coated. Approximately the upper ten to twenty percent of the surface length of the electrode is coated, i.e. the upper 6 to 8 inches thereof. One form of material found to provide satisfactory results is an epoxy material available commercially under the tradename Pro Tek from the Baltimore Paint and Chemical Corporation, made by mixing equal quantities of Duratyle epoxy hibuild reactor component No. 2 and Duratyle epoxy regular high gloss base A.

The extending portions 164, 168 of the two electrodes 158 adjacent end electrodes 134 and 136, respectively, according to the present invention together with the insulating coating thereof eliminates difficulties associated with current density effects which otherwise lead to early failure of the end electrodes. In conjunction with this, the distance between the top of the electrodes and the top of the cell is made as small as possible while allowing for adequate liquid outflow from the cell, inasmuch as the top of the cell tends to cut any lines flux incident thereon. The liquid level in the cell is controlled so as to submerge all of the electrodes but just slightly over the extending portions 164, 168 of the shielding electrodes. The electrodes should not be submerged to an excessive degree because the liquid electrolyte can provide a relatively easy path for flux fields.

In addition to bipolar operation of the cell, the polarity of the electrical potential applied to the end plates 134, 136 is reversed at regular intervals determined by the cell current density which, in turn, is determined by the operating conditions. Reversing or switching the polarity reverses the direction of current flow of current in the electrolyte between electrodes thereby assuring that dissolution of the end electrodes 134, 136 occurs at an equal rate, and that the dissolution of the electrodes 158 between them occurs uniformly on both sides. In addition, reversing the current flow in the foregoing manner eliminates the possiblity of buckling of the electrodes which could cause shorting between adjacent electrodes and also mechanical difficulties in removing a spent electrode from the cell. Reversing polarity of the potential applied to electrodes 134, 136 is accomplished by a suitable switching means associated with power supply 30 which can be manually operated or automatically controlled by a timer in a known manner. The rate at which the polarity is reversed depends upon the current density, and by way of illustration typical rates are in the range from about one reversal per hour to two reversals per week.

The method and apparatus of the present invention is illustrated further by the foregoing examples.

EXAMPLE I

Cooling tower blowdown water was supplied to the inlet of apparatus similar that of FIG. 1 at a rate of 25 gallons per minute with a hexavalent chrome concentration of about 3.5 p.p.m. The apparatus has a total effective electrode weight of 217 pounds, and was operated at about 4.0 amperes and between 11.5 volts and 14.0 volts. The method of the present invention was performed continuously with the acid washing step being done for a period of 15 to 30 minutes per day. Each day 1.05 pounds of hexavalent chrome was removed and the effluent contained less than 0.05 p.p.m. of hexavalent chrome, often falling to undetectable limits.

At the time the electrodes were changed, it was observed that only about 60% of the available iron had been utilized and that the electrodes still were in quite good condition and could have been used for a longer period of time. The sludge analysis indicated approximately 3.5 pounds of iron per pound of chrome compared to a theoretical useage of 3.2. The two cells contained a total active electrode weight of 204 pounds. Assuming that 75% of the electrodes could be used before replacement, there is 153 pounds of useable iron available for chrome reduction. At this rate, the cells could operated approximately 42 days prior to electrode replacement. At 75% electrode utilization, equivalent iron usage would be 4.3 pounds per pound of chrome and at 90% utilization the value would be 3.6 pounds per pound of chrome. In the event that the electrodes are not run for the standard period the apparent iron usage goes up. In this example, during the time the electrodes operated with 60% of the electrode life, their apparent iron usage was 5.7 pounds per pound of chrome whereas actually they were using 3.5 pounds. In this example, the operation for about 25 days removed 27 pounds of hexavalent chrome for an iron to chrome ratio of 5.7.

EXAMPLE II

Cooling tower blowdown water was supplied to the inlet of apparatus similar to that of FIG. 1 but of greater capacity than that used in Example I at a rate of 88 gallons per minute with a hexavalent chrome concentration of about 8.0 p.p.m. The higher concentration and flow of this particular blowdown water required a current of about 14 amperes and a potential between 40–50 volts. The cells were operated 24 hours per day except for the acid wash procedure and treated 8.3 pounds of hexavalent chrome each day. The effluent cntained less than 0.05 p.p.m. of hexavalent chrome. The apparatus had available 485 pounds of useable iron based on 75% electrode utilization, and the plant required the removal of 8.3 pounds of hexavalent chrome each day. Under the foregoing conditions, operation for approximately 17 days prior to electrode replacement was predicted.

Operating data from the electrochemical method and apparatus of the present invention for chromate removal for treatment of cooling tower blowdown water has shown that chrome levels consistently under 0.05 p.p.m. can be achieved with no pH adjustment of the incoming water provided that it is in the range of approximately 5 to 10. Zinc ion frequently accompanies chromate in cooling tower blowdown water, and in most cases the effluent from the apparatus has a pH in a range adequate to remove the bulk of the zinc which is present.

It is therefore apparent that the present invention accomplishes its intended objects. Treating the electrodes with an acid solution removes any substances on or lodged between the electrode surfaces arising from the reaction or from the incoming liquid. Applying electrical potential directly to only the outer or end electrodes, with charge being induced in the additional closely spaced electrodes therebetween, advantageously permits cell operation to be at a relatively low current and relatively high voltage which, in turn, allows use of relatively more efficient power supply apparatus. The electrode arrangement, including the provision of the shielding electrodes protects the end elecrodes, to which direct electrical connection is made, from flux field effects and excessive current density. Changing the polarity of applied potential at regular intervals insures relatively even dissolution of the electrodes. While the foregoing embodiments of the present invention have been described in detail, this is for the purpose of illustration, not limitation.

We claim:

1. In an electrochemical cell for removing a contaminant ion from an ionizing medium and having a cell body:
   a. a pair of outer electrode elements positioned in said body in spaced apart relation;
   b. means for applying electrical potentials of opposite polarity directly to said outer electrodes;
   c. additional electrode elements between said outer electrode elements in closely spaced relation;
   d. means in said cell body defining a flow path for an ionizing medium in operative relation to said electrodes;
   e. whereby the electric potentials applied to said outer electrode elements induce electric charge on said additional electrode elements to cause electric current flow through said ionizing medium; and
   f. one of said additional electrode elements in neighboring relation to a corresponding one of said outer electrode elements being of sufficient size so as to extend beyond said outer electrode element so as to shield said outer electrode element from flux field effects causing excessive current density.

2. An electrochemical cell according to claim 1, wherein said electrodes are of iron.

3. An electrochemical cell according to claim 1, further including a coating of electrically insulating material on the surface of the extending portion of said additional electrode disposed toward the outer electrode.

4. An electrochemical cell according to claim 1, wherein an additional electrode element neighboring each of said outer electrode elements is of sufficient size so as to extend beyond the corresponding outer electrode so as to shield the outer electrodes from flux field effects causing excessive current density.

5. An electrochemical cell according to claim 4, wherein said electrodes are of iron.

6. An electrochemical cell according to claim 4 further including a coating of electrically insulating material on the surface of the extending portions of said additional electrodes disposed toward the outer electrodes.

7. An electrochemical cell according to claim 1, wherein said cell body is disposed generally vertically in use and said electrode are planar and disposed in generally vertically parallel relation in said body, said outer electrodes having potential applied thereto near the tops thereof and there being a region between the tops of said electrodes and the top of said cell body, and wherein an additional electrode element adjacent each of said outer electrode elements extends beyond the top of the corresponding outer electrode element into said region by an amount sufficient to protect the outer electrodes from flux field effects and excessive current density.

8. An electrochemical cell according to claim 7, wherein said electrodes are of iron.

9. An electrochemical cell according to claim 7 further including a coating of electrically insulating material on the surface of said extending portions of said additional electrodes disposed toward the outer electrodes.

10. An electrochemical cell according to claim 1 further including means for changing the relative polarity of the potentials applied to said outer electrodes.

11. An electrochemical cell according to claim 1, wherein said electrical potential applying means is connected to said outer electrodes adjacent one end of each electrode and wherein said additional electrode element extends beyond said corresponding outer electrode adjacent said one end of said outer electrode.

12. An electrochemical cell according to claim 1, wherein said electrodes are planar and disposed in generally parallel relation in said cell body, said outer electrodes being shorter in length than said one additional electrode element, the remainder of said additional electrode elements being of substantially uniform length and shorter than said outer electrodes and said one additional electrode element.

13. An electrochemical cell according to claim 1, wherein said one additional electrode element is adjacent said corresponding one of said outer electrode elements.

* * * * *